(12) United States Patent
Bae

(10) Patent No.: US 11,561,136 B2
(45) Date of Patent: Jan. 24, 2023

(54) SYSTEM FOR MOUNTING MOTOR TEMPERATURE SENSOR

(71) Applicants: HYUNDAI MOTOR COMPANY, Seoul (KR); KIA MOTORS CORPORATION, Seoul (KR)

(72) Inventor: Kyung Gook Bae, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 236 days.

(21) Appl. No.: 17/034,662

(22) Filed: Sep. 28, 2020

(65) Prior Publication Data

US 2021/0278284 A1    Sep. 9, 2021

(30) Foreign Application Priority Data

Mar. 4, 2020  (KR) .................. 10-2020-0027245

(51) Int. Cl.
| | |
|---|---|
| *G01K 1/14* | (2021.01) |
| *G01K 1/08* | (2021.01) |
| *H02K 11/25* | (2016.01) |
| *H02K 5/04* | (2006.01) |
| *H02K 3/12* | (2006.01) |
| *H02K 1/26* | (2006.01) |

(52) U.S. Cl.
CPC .............. *G01K 1/14* (2013.01); *G01K 1/08* (2013.01); *H02K 1/26* (2013.01); *H02K 3/12* (2013.01); *H02K 5/04* (2013.01); *H02K 11/25* (2016.01)

(58) Field of Classification Search
CPC .. H02K 1/26; H02K 3/12; H02K 5/04; H02K 11/25; G01K 1/14; G01K 1/08; G01K 13/08
See application file for complete search history.

(56) References Cited

U.S. PATENT DOCUMENTS

2019/0386533 A1* 12/2019 Lee ..................... H02K 1/16

FOREIGN PATENT DOCUMENTS

| JP | 2003092858 A | * | 3/2003 | ............ H02K 11/25 |
| JP | 2017026521 A | * | 2/2017 | |

OTHER PUBLICATIONS

JP2017026521A English translation (Year: 2022).*
JP2003092858A English translation (Year: 2022).*

* cited by examiner

*Primary Examiner* — Tulsidas C Patel
*Assistant Examiner* — Viswanathan Subramanian
(74) *Attorney, Agent, or Firm* — Morgan, Lewis & Bockius LLP

(57) ABSTRACT

A system for mounting a motor temperature sensor includes: a hairpin wound stator including a stator core having a plurality of slots, and a plurality of hairpins inserted into the slots of the stator core; and a motor temperature sensor including a sensor element and a sensor housing covering the sensor element, wherein the sensor housing is detachably fitted into one of the plurality of hairpins.

9 Claims, 13 Drawing Sheets

SYSTEM FOR MOUNTING MOTOR TEMPERATURE SENSOR

CROSS-REFERENCE TO RELATED APPLICATION

The present application is based on and claims the benefit of priority to Korean Patent Application No. 10-2020-0027245, filed on Mar. 4, 2020 in the Korean Intellectual Property Office, the disclosure of which is incorporated herein in its entirety by reference.

TECHNICAL FIELD

The present disclosure relates to a system for mounting a motor temperature sensor.

BACKGROUND

A motor includes a stator assembly which is disposed in a motor housing and a rotor assembly which is rotatable with respect to the stator assembly. The stator assembly has a stator core and stator coils wound around the stator core.

Some motors, such as driving motors for eco-friendly vehicles, use a hairpin wound stator. The hairpin wound stator includes a stator core having a plurality of slots and a plurality of hairpins inserted into the plurality of slots. Each hair pin serves as a conductor, and the plurality of hairpins are electrically conductively connected so that the plurality of hairpins may form a stator coil.

The winding configuration of the stator coils may be divided into distributed winding, concentrated winding, etc. The stator coils may be divided into a circular coil having a circular cross-section, a flat coil having a rectangular cross-section, etc. The stator coils of the hairpin wound stator may have the distributed winding configuration.

The motor includes a coil which is a main heat source of the motor, and a motor temperature sensor which measures a temperature of a terminal connected to the coil. The motor controls its output and cooling on the basis of the temperature measured by the motor temperature sensor.

The motor temperature sensor may be divided into a double shrinkable type, a case type, etc.

A double shrinkable type motor temperature sensor includes a sensor element and a heat-shrinkable tube covering the sensor element by heat shrinkage, and the heat-shrinkable tube is made of a Teflon material. Since the double shrinkable type motor temperature sensor has the heat-shrinkable tube extending in a longitudinal direction thereof, it may sense the temperature in all directions regardless of the mounting direction (the direction of attachment). Since the double shrinkable type motor temperature sensor is not affected by the mounting direction, it may be disposed between the coils, and may be advantageously applied to a circular type stator coil. However, when the double shrinkable type motor temperature sensor is attached to a flat coil, it may relatively increase errors in temperature measurement as it senses the temperature in all directions. In particular, since the double shrinkable type motor temperature sensor has a tube shape, it is difficult to attach it to the hairpin wound stator.

A case type motor temperature sensor includes a box-shaped housing and a sensor element received in the housing. The sensor element is fixed into the housing using an epoxy resin and the like. Since the case type motor temperature sensor has the sensor element located on a bottom surface of the housing, the mounting direction thereof is important. Since the bottom surface of the housing is flat, the case type motor temperature sensor may be advantageously applied to the concentrated winding configuration. However, it is difficult to attach the case type motor temperature sensor to the hairpin wound stator due to its shape.

Since it is difficult to attach the conventional motor temperature sensor to the hairpin wound stator due to its shape, the mounting position of the temperature sensor may be inaccurate, which may increase errors in temperature measurement.

In addition, the conventional motor temperature sensor is first fixed to the hairpin wound stator with lacing cord and the like, and is then fixed with epoxy resin. Thus, the conventional motor temperature sensor has disadvantages of a complex assembly process and increased manufacturing cost.

The above information described in this background section is provided to assist in understanding the background of the inventive concept, and may include any technical concept which should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides a system for mounting a motor temperature sensor, capable of accurately and stably mounting the motor temperature sensor to a hairpin wound stator, simplifying an assembly process (mounting process), and reducing manufacturing cost.

According to an aspect of the present disclosure, a system for mounting a motor temperature sensor may include: a hairpin wound stator including a stator core having a plurality of slots, and a plurality of hairpins inserted into the slots of the stator core; and a motor temperature sensor including a sensor element and a sensor housing covering the sensor element, wherein the sensor housing may be detachably fitted into one of the plurality of hairpins.

Each hairpin may include a crown portion and two leg portions extending from the crown portion, the crown portion may include an apex and first and second inclined portions extending obliquely from the apex, and the apex may be curved so that an axis of the second inclined portion may be offset with respect to an axis of the first inclined portion in a radial direction of the stator core.

The sensor housing may include two mounting ribs joined to the apex of the hairpin in a surface contact manner, and each of the mounting ribs may be curved in the same shape as that of the apex.

The two mounting ribs may be spaced apart from each other in a width direction of the sensor housing, a mounting recess may be defined between the two mounting ribs, and the apex of the hairpin may be fitted into the mounting recess.

Each of the mounting ribs may have a contact surface directly contacting a respective side of the apex of the hairpin.

The sensor element may be located above the mounting ribs.

The sensor housing may further include a support projection spaced apart from the mounting ribs, and the support projection may support an apex of another hairpin disposed adjacent to the hairpin to which the mounting ribs are joined.

The support projection may have a support surface contacting the apex of the adjacent hairpin.

The sensor housing may have two grip recesses, and the two grip recesses may be located above the mounting ribs.

The sensor element may be located between the two grip recesses.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
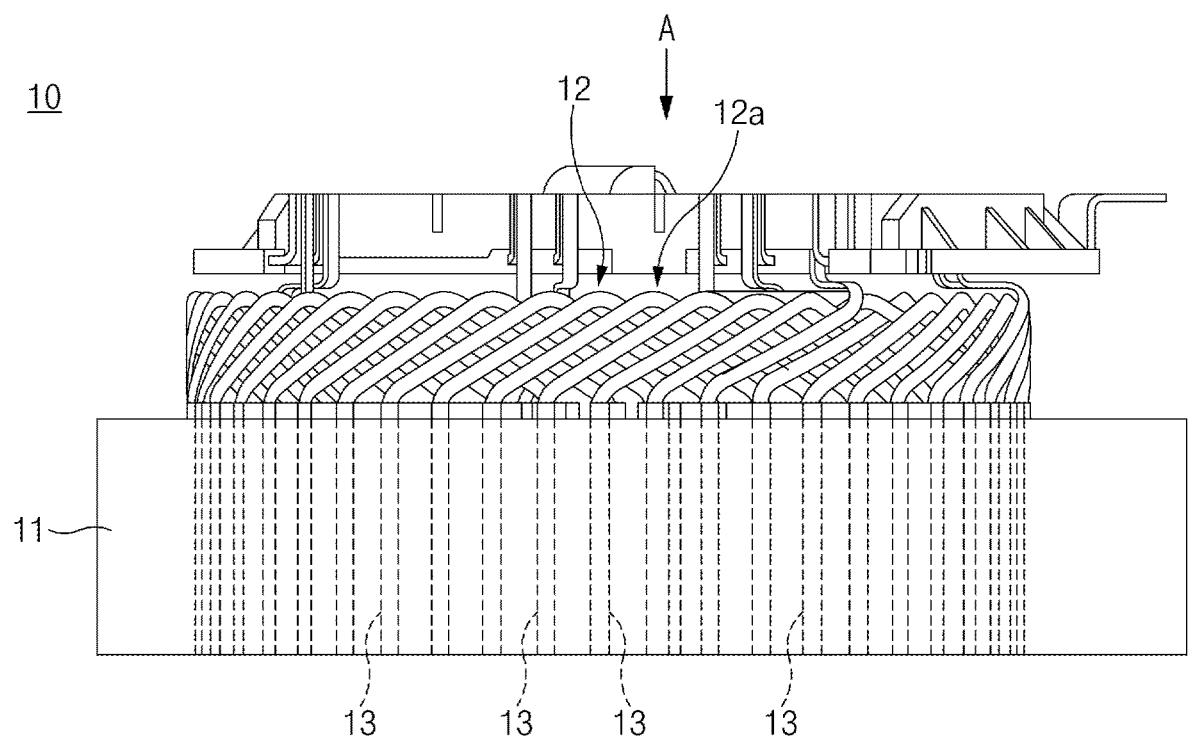
FIG. 1 illustrates a front view of a hairpin wound stator according to an exemplary embodiment of the present disclosure.

Hereinafter, exemplary embodiments of the present disclosure will be described in detail with reference to the accompanying drawings. For reference, the dimensions of elements, thicknesses of lines, and the like, illustrated in the drawings referred to in the description of exemplary embodiments of the present disclosure, may be exaggerated for convenience of understanding. Terms used for describing the present inventive concept have been defined in consideration of the functions of elements, and may be altered in accordance with the intention of a user or an operator, in view of practice, or the like. Therefore, the terms should be defined on the basis of the entirety of this specification.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
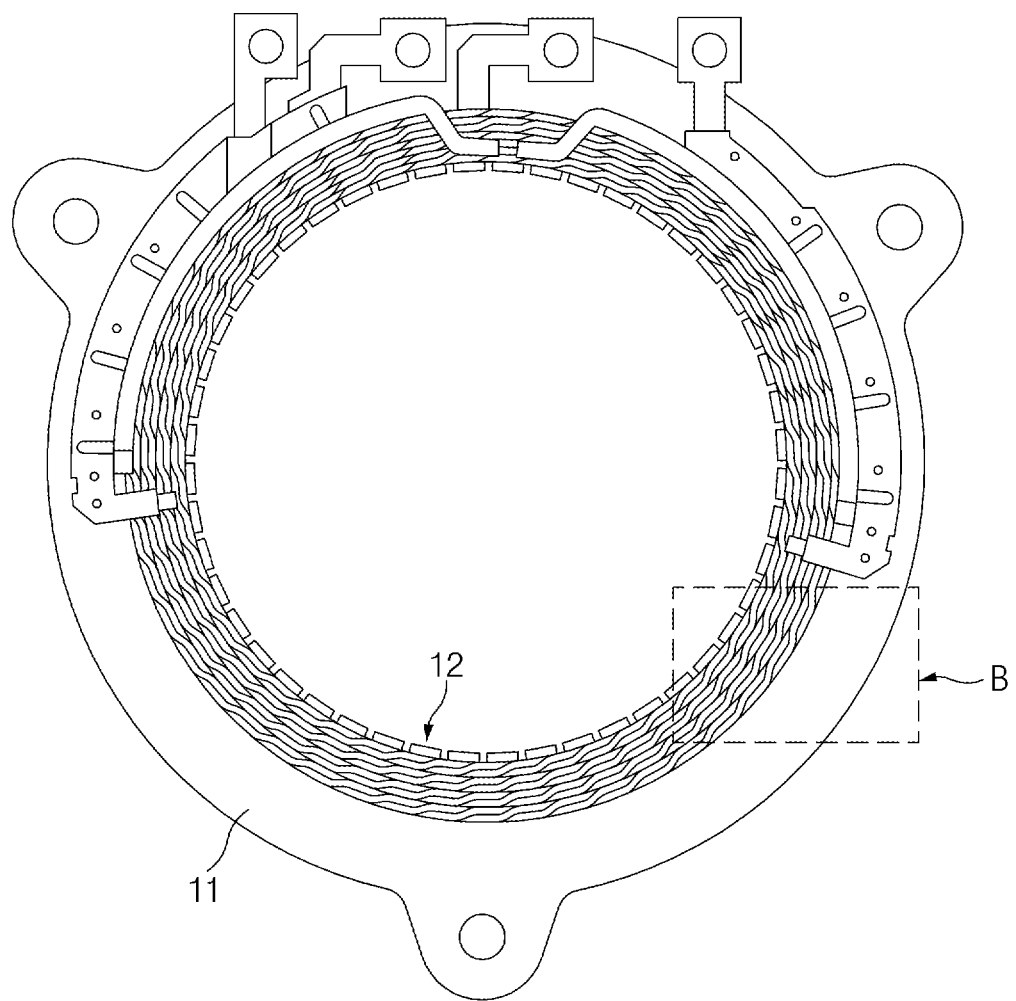
FIG. 2 illustrates a view which is viewed from a direction indicated by arrow A in FIG. 1.

FIGS. 1 and 2 illustrate an example of a hairpin wound stator. A hairpin wound stator 10 may include a stator core 11 having a plurality of slots 13, and a plurality of hairpins 12 and 12a inserted into the plurality of slots 13, respectively.

The plurality of slots 13 may be spaced apart from one another in a circumferential direction of the stator core 11. Each slot 13 may extend in a longitudinal direction or an axial direction of the stator core 11. The hairpins 12 and 12a may be individually inserted into the slots 13.

Figure 3:
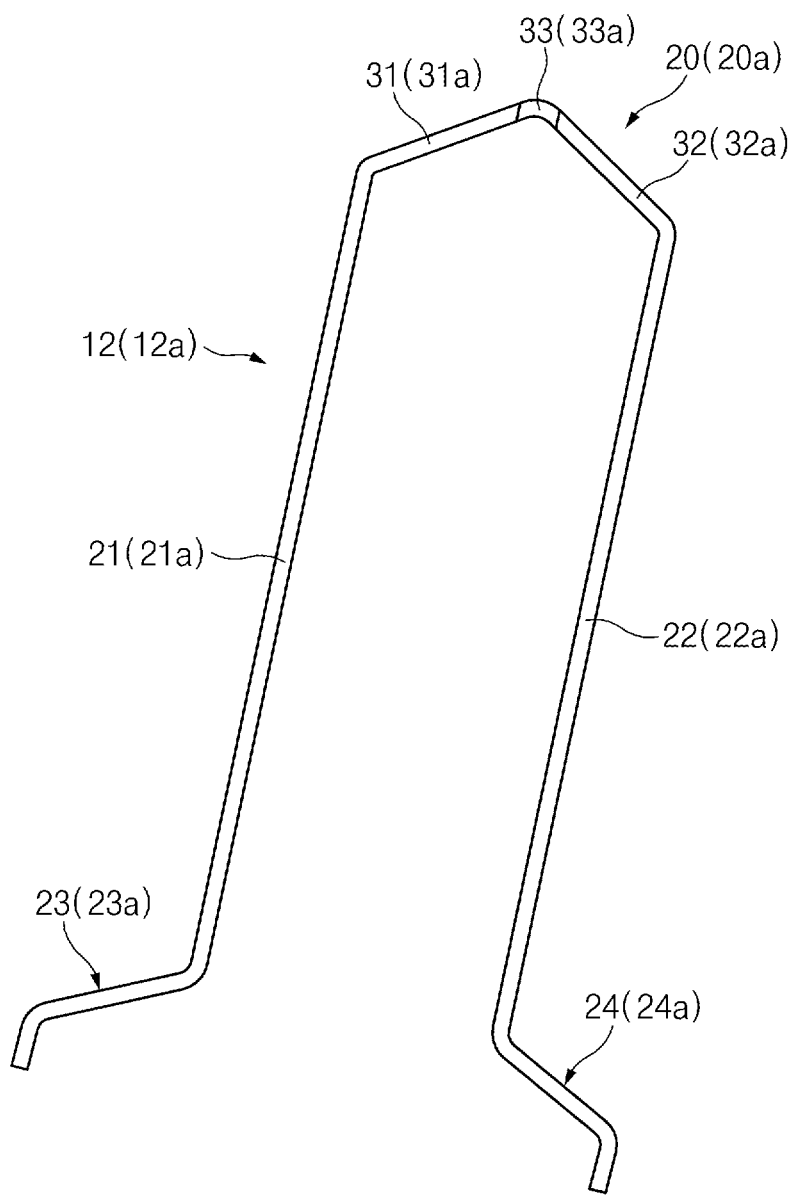
FIG. 3 illustrates a perspective view of a hairpin of the hairpin wound stator illustrated in FIG. 1.

Referring to FIG. 3, the hairpins 12 and 12a may include crown portions 20 and 20a, and first leg portions 21 and 21a and second leg portions 22 and 22a extending from the crown portions 20 and 20a, respectively. One leg portion of the hairpin 12 (12a) may be coupled to one of the plurality of slots 13.

Figure 5:
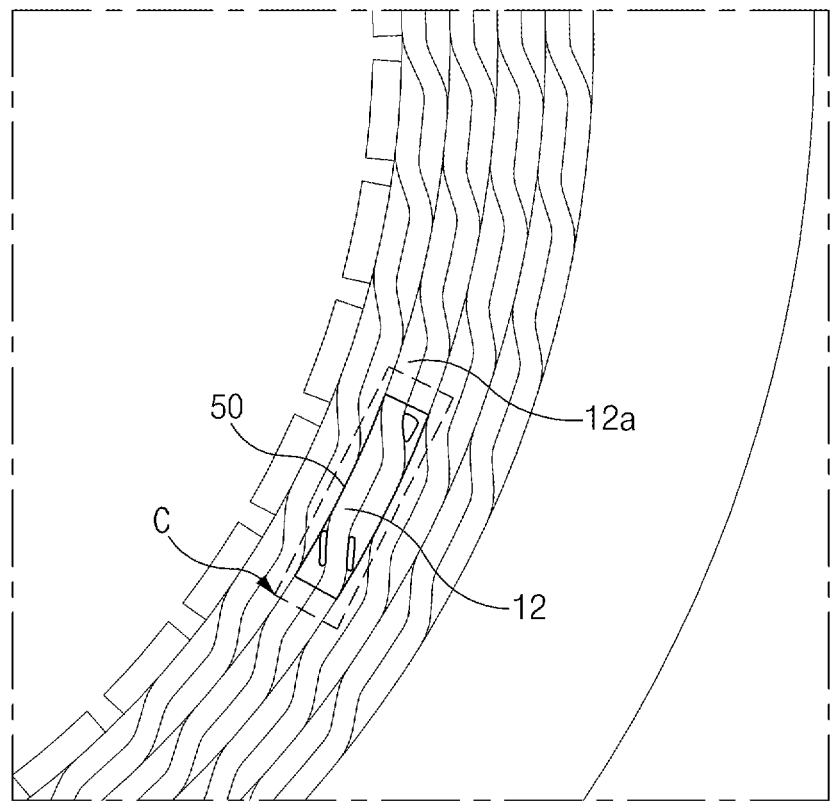
FIG. 5 illustrates an enlarged view of portion B in FIG. 2.

The crown portions 20 and 20a may protrude upwardly from a top end of the stator core 11. The crown portions 20 and 20a may include apexes 33 and 33a (e.g., a highest portion of each hairpin), and first inclined portions 31 and 31a and second inclined portions 32 and 32a extending obliquely from the apexes 33 and 33a, respectively. Referring to FIG. 5, the apexes 33 and 33a may be curved in an S-shape so that an axis X2 of the second inclined portions 32 and 32a may be offset with respect to an axis X1 of the first inclined portions 31 and 31a in a radial direction of the stator core 11.

The first leg portions 21 and 21a and the second leg portions 22 and 22a may extend substantially straight in the longitudinal direction of the stator core 11, and the first leg portions 21 and 21a and the second leg portions 22 and 22a may be parallel to each other. The first leg portions 21 and 21a and the second leg portions 22 and 22a may be individually inserted into the slots 13.

Figure 4:
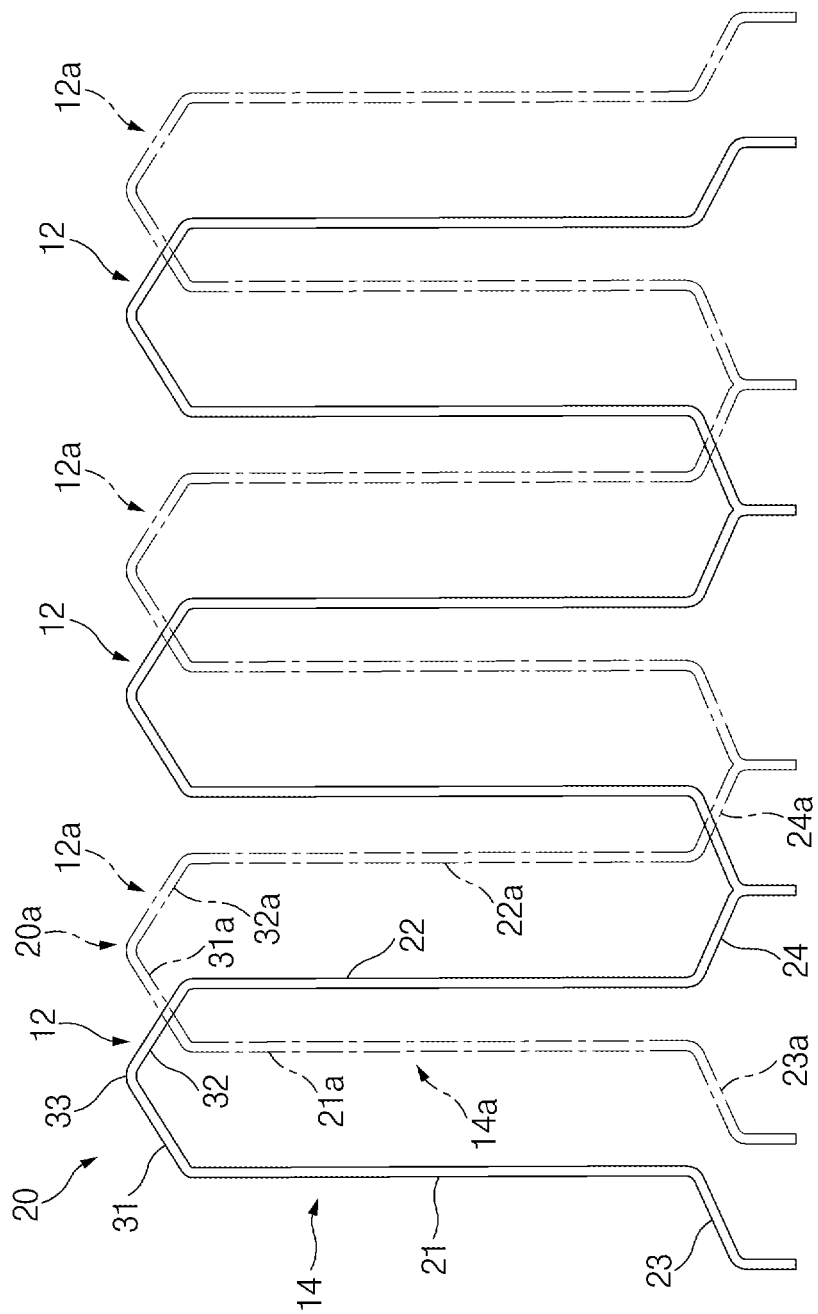
FIG. 4 illustrates a schematic wiring diagram for a hairpin wound stator according to an exemplary embodiment of the present disclosure.

The hairpins 12 and 12a may include first extension portions 23 and 23a extending obliquely from respective bottom ends of the first leg portions 21 and 21a, and second extension portions 24 and 24a extending obliquely from respective bottom ends of the second leg portions 22 and 22a. The first extension portions 23 and 23a and the second extension portions 24 and 24a may protrude downwardly from a bottom end of the stator core 11 (not shown), such that the top and bottom ends of each hairpin 12 are disposed outside the top and bottom ends of the stator core 11. Referring to FIG. 4, the plurality of hair pins 12 and 12a are arranged in a plurality of layers 14 and 14a. The plurality of layers 14 and 14a are arranged in a radial direction of the stator core 11, and thus the plurality of hairpins 12 and 12a may form a stator coil. For example, two layer 14 and 14a may be adjacent to each other in the radial direction of the stator core 11, the hairpins 12 are electrically conductively connected to form one layer 14, and the hairpins 12a are electrically conductively connected to form other layer 14a.

Figure 6:
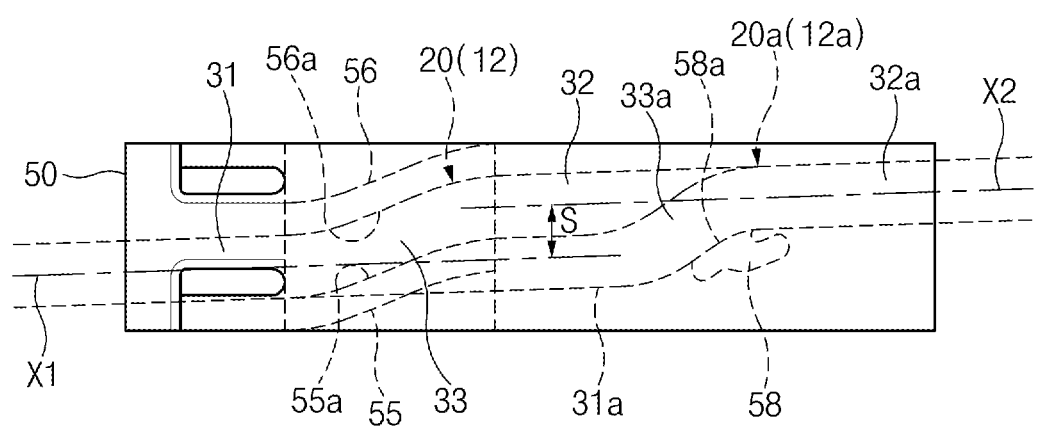
FIG. 6 illustrates an enlarged view of portion C in FIG. 4.

Referring to FIGS. 5 and 6, a motor temperature sensor 50 according to an exemplary embodiment of the present disclosure may be detachably fitted to the hairpins 12 and 12a of the hairpin wound stator 10. In one embodiment, the motor temperature sensor 50 may be a negative temperature coefficient (NTC) thermistor, but the type of the sensor 50 is not limited thereto.

Referring to FIGS. 7 to 12, the motor temperature sensor 50 according to an exemplary embodiment of the present disclosure may include a sensor element 51 and a sensor housing 52 covering the sensor element 51.

The sensor element 51 and electric wires connected to the sensor element 51 may be embedded in the sensor housing 52, and the sensor housing 52 may include a resin material. In one embodiment, the sensor element 51 and the wires may be integrally joined to the sensor housing 52 by, e.g., insert molding. Thus, the sensor element 51 and the sensor housing 52 may form a unitary one-piece structure.

Figure 7:
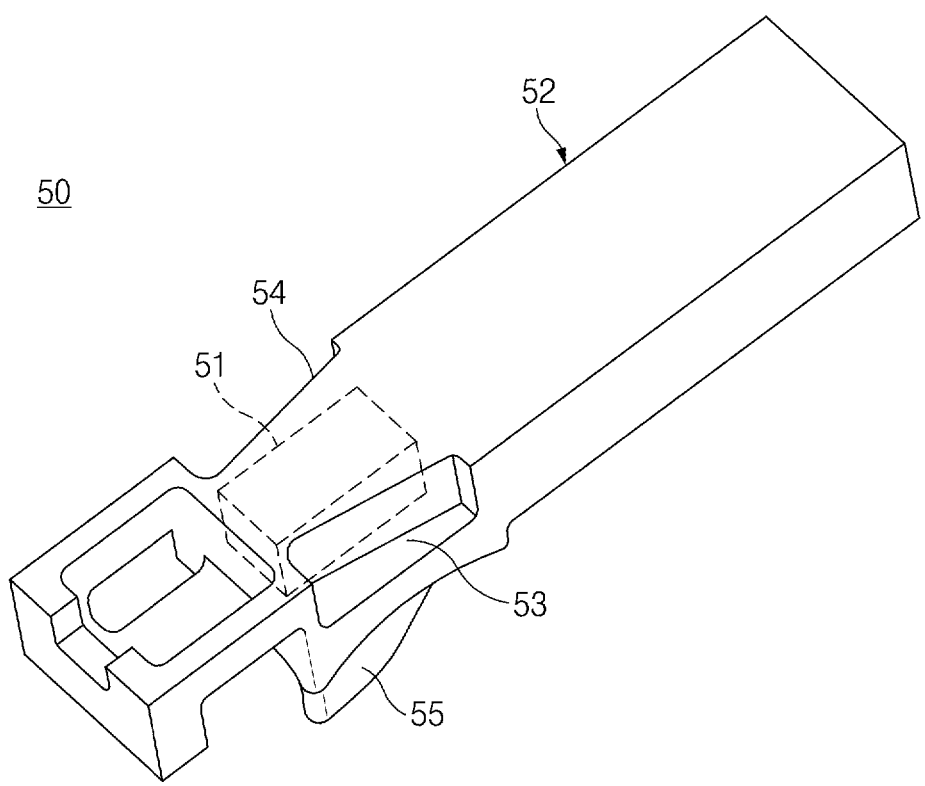
FIG. 7 illustrates a top perspective view of a motor temperature sensor according to an exemplary embodiment of the present disclosure.
Figure 8:
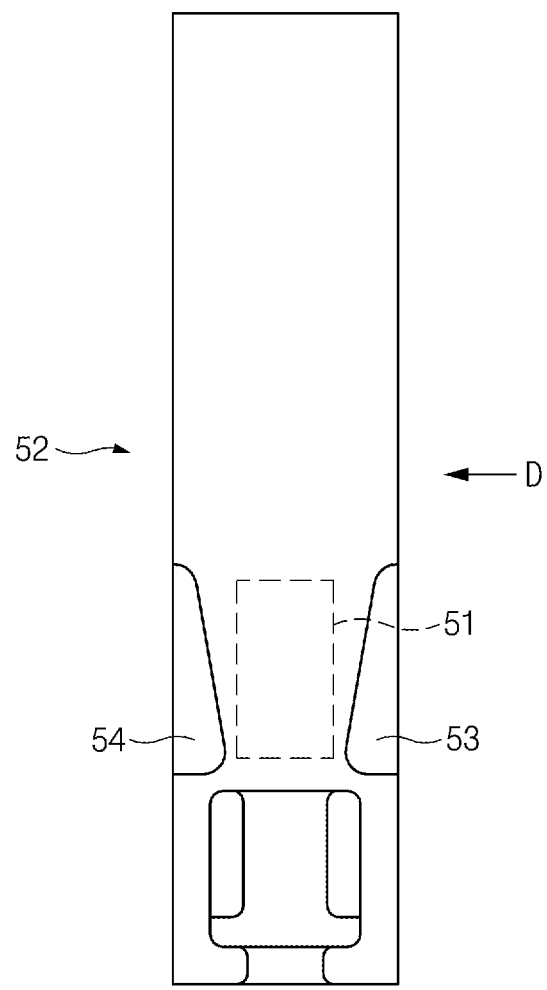
FIG. 8 illustrates a plan view of a motor temperature sensor according to an exemplary embodiment of the present disclosure.
Figure 9:
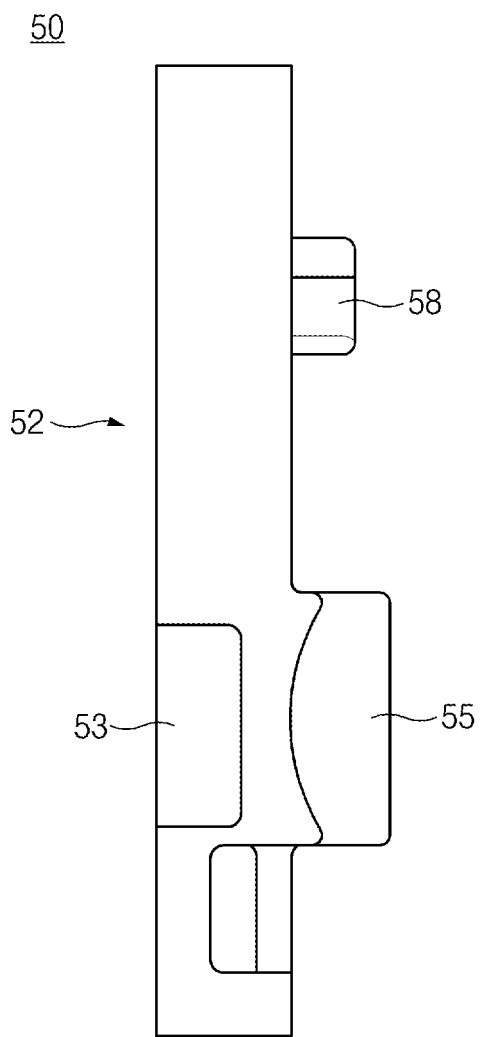
FIG. 9 illustrates a view which is viewed from a direction indicated by arrow D in FIG. 8.

Referring to FIGS. 7 to 9, the sensor housing 52 may have a cuboid shape. The sensor housing 52 may have two opposing grip recesses 53 and 54, and an operator may easily grip the sensor housing 52 via the grip recesses 53 and 54. The sensor housing 52 may be easily mounted to the hairpins 12 and 12a of the hairpin wound stator 10 by the two grip recesses 53 and 54. The two grip recesses 53 and 54 may be located on both opposing sides of the sensor housing 52, respectively.

Figure 10:
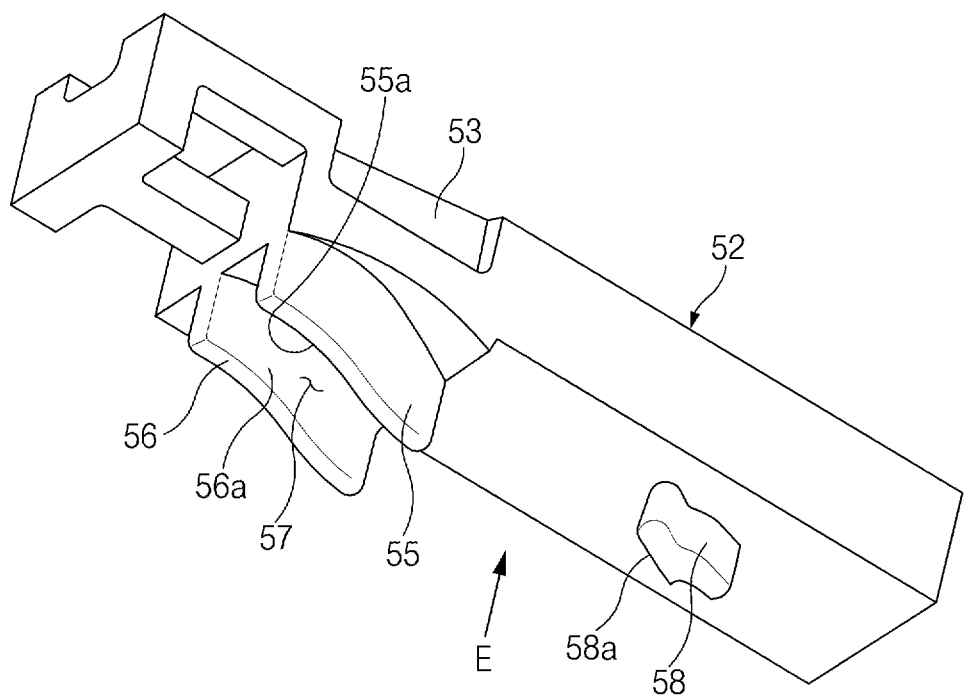
FIG. 10 illustrates a bottom perspective view of a motor temperature sensor according to an exemplary embodiment of the present disclosure.
Figure 11:
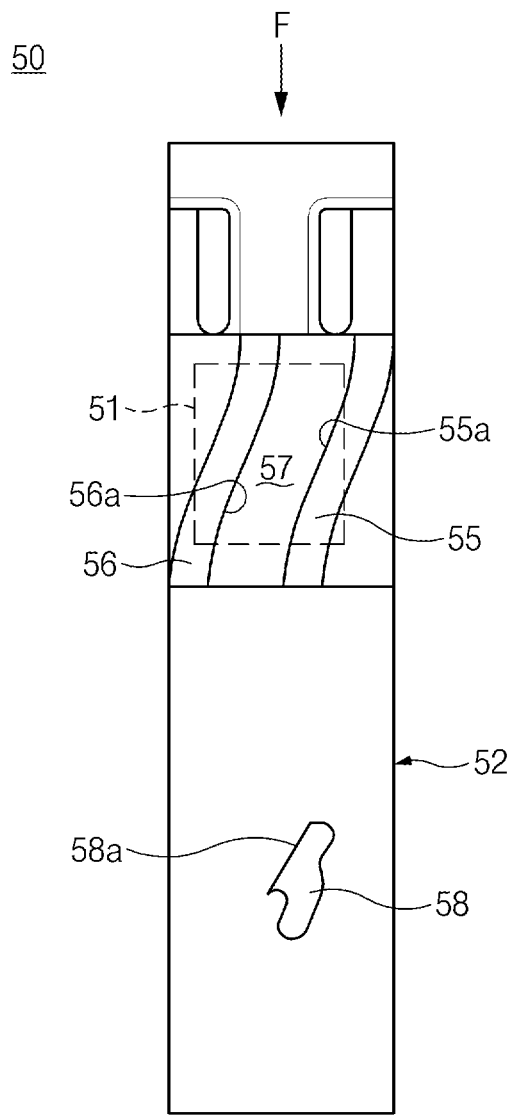
FIG. 11 illustrates a view which is viewed from a direction indicated by arrow E in FIG. 10.
Figure 12:
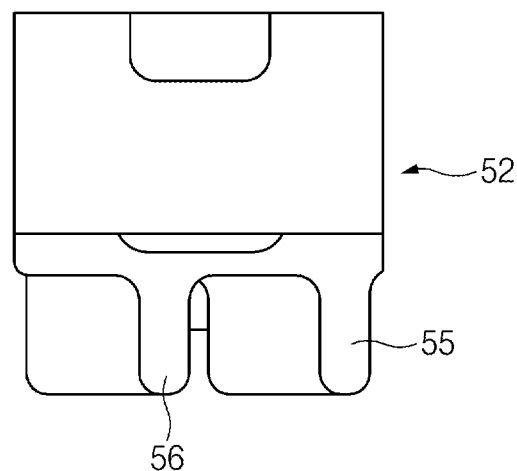
FIG. 12 illustrates a view which is viewed from a direction indicated by arrow F in FIG. 11.

Referring to FIGS. 10 to 12, the sensor housing 52 may have two mounting ribs 55 and 56 facing each other, and the mounting ribs 55 and 56 may be spaced apart from each other in a width direction of the sensor housing 52. A mounting recess 57 may be defined between the mounting ribs 55 and 56. The mounting ribs 55 and 56 may protrude from a bottom surface of the sensor housing 52 toward the hairpin wound stator 10. At least a portion of the hairpins 12 and 12a of the hairpin wound stator 10 may be fitted into the mounting recess 57 so that the motor temperature sensor 50 may be firmly mounted to at least one hairpin 12 of the hairpin wound stator 10.

In particular, the mounting ribs 55 and 56 may be curved in the same shape as that of the apex 33 of the hairpin 12, and the mounting ribs 55 and 56 may have contact surfaces 55a and 56a directly contacting two opposite sides, respectively, of the apex 33 of the hairpin 12. The mounting recess 57 may have a shape and a dimension corresponding to those of the apex 33 of the hairpin 12. Thus, the two mounting ribs 55 and 56 may receive both opposite sides of the apex 33 by direct surface contact, and the apex 33 of the hairpin 12 may be firmly fitted into the mounting recess 57 of the sensor housing 52 as illustrated in FIGS. 2 and 3. That is, the sensor housing 52 may be easily and firmly mounted to the apex 33 of the hairpin 12 through the mounting ribs 55 and 56 and the mounting recess 57, and thus adhesive or bonding means such as epoxy resin and lacing cord may be removed. In particular, the two mounting ribs 55 and 56 may be curved in the same shape as that of the apex 33 of the hairpin 12, and the contact surfaces 55a and 56a of the mounting ribs 55 and 56 may support the hairpin 12 in a surface contact manner, and thus a contact area between the sensor housing 52 and the hairpin 12 may be significantly increased compared to the related art. As such, a heat transfer area is increased, temperature sensing (response) of the sensor element 51 may be improved, and an error in temperature measurement may be reduced.

In addition, according to an exemplary embodiment of the present disclosure, the sensor housing 52 may be firmly and easily mounted to the apex 33 of the hairpin 12 through the mounting recess 57 defined by the two mounting ribs 55 and 56, and thus the assembly (mounting) and attachment of the motor temperature sensor 50 may be improved, and an error in the mounting position of the motor temperature sensor 50 may be reduced.

Figure 13:
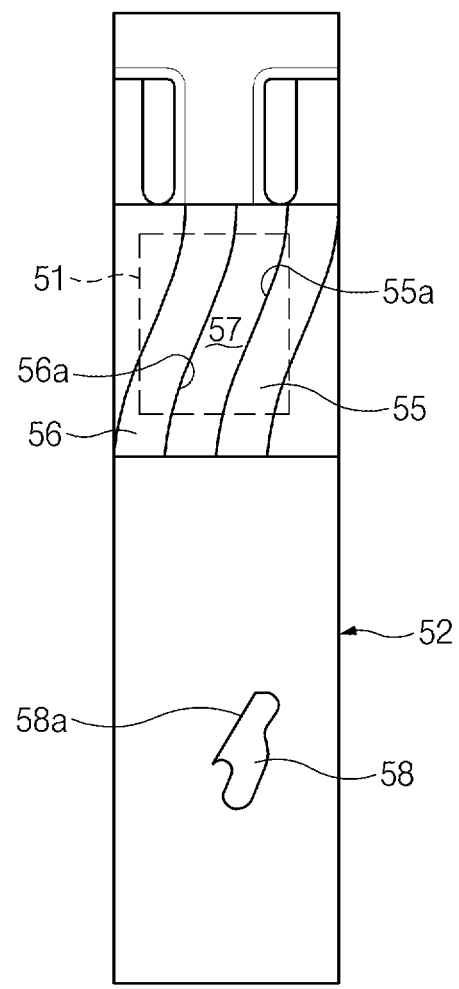
FIG. 13 illustrates an alternative embodiment with respect to the construction shown in FIG. 11

Referring to FIG. 13, each of the mounting ribs 55 and 56 may have a thickness which is slightly greater than or equal to that of the apex 33 of the hairpin 12, and thus the mounting ribs 55 and 56 may obtain enough stiffness to support the apex 33 of the hairpin 12.

As the two mounting ribs 55 and 56 are curved in the same shape as that of the apex 33 of the hairpin 12, the mounting position of the motor temperature sensor 50 may be accurately regulated. Thus, an error in the mounting position of the motor temperature sensor 50 may be reduced, and an accuracy of the temperature sensing from the motor temperature sensor 50 may be improved. In addition, as the mounting ribs 55 and 56 and the mounting recess 57 of the sensor housing 52 are firmly mounted to the apex 33 of the hairpin 12, the sensor housing 52 may not be easily separated from the apex 33 of the hairpin 12 or may be prevented from moving in the width direction and/or the longitudinal direction of the sensor housing 52 even when an unintended force is applied to the sensor housing 52.

The mounting ribs 55 and 56 and the mounting recess 57 may be located right below the grip recesses 53 and 54, and the sensor element 51 may be located between the two grip recesses 53 and 54. When the sensor housing 52 is mounted to the apex 33 of the hairpin 12 through the mounting recess 57 and the mounting ribs 55 and 56, the sensor element 51 may be located right above the mounting recess 57 and the mounting ribs 55 and 56, and thus the motor temperature sensor 50 may measure the temperature of the hairpin 12 more accurately. That is, the performance (response) of the motor temperature sensor 50 may be significantly improved.

The sensor housing 52 may have a support projection 58, and the support projection 58 may be spaced apart from the mounting ribs 55 and 56 in the longitudinal direction of the sensor housing 52 (or in the circumferential direction of the stator core 11). The support projection 58 may protrude from the bottom surface of the sensor housing 52 toward the hairpins 12 and 12a. The support projection 58 may have a support surface 58a.

The support projection 58 of the sensor housing 52 may support the apex 33a of the hairpin 12a disposed immediately adjacent to the hairpin 12 to which the mounting ribs 55 and 56 and the mounting recess 57 are joined. The support surface 58a may be curved in the same shape as that of the adjacent hairpin 12a, and thus the support surface 58a may have a structure and a shape directly contacting the apex 33a of the hairpin 12a. Specifically, the support surface 58a of the support projection 58 may be supported with respect to the apex 33a of the hairpin 12a by direct surface contact so that the sensor housing 52 may be firmly mounted between the two adjacent hairpins 12 and 12a. Thus, the sensor housing 52 may be mounted between any two adjacent hairpins 12 and 12a more firmly and stably. In particular, when the mounting ribs 55 and 56 of the sensor housing 52 are joined to one hairpin 12, the support surface 58a of the support projection 58 may be supported to the apex 33a of the adjacent hairpin 12a, and thus the sensor housing 52 may be prevented from rotating by an unintended force.

According to an exemplary embodiment, the hairpin wound stator 10 may have a plurality of hairpins arranged in a plurality of layers in a radial direction of the stator core 11, e.g., eight layers. The highest heat generation may occur in an innermost layer (a first layer), and the motor temperature sensor 50 may be mounted on a third layer or a fourth layer in order to facilitate the assembly of a rotator.

As set forth above, according to exemplary embodiments of the present disclosure, since the motor temperature sensor 50 is mounted to the apex 33 of the hairpin 12 through the mounting ribs 55 and 56 and the mounting recess 57 of the sensor housing 52, adhesive or bonding means such as lacing cord and epoxy resin may be removed. Thus, the assembly process (mounting process) may be simplified and the manufacturing cost may be reduced.

According to exemplary embodiments of the present disclosure, the two mounting ribs 55 and 56 may be curved in the same shape as that of the apex 33 of the hairpin 12, and the contact surfaces 55a and 56a of the mounting ribs 55 and 56 may be supported to the hairpin 12 in a surface contact manner so that the contact area between the sensor housing 52 and the hairpin 12 may be significantly increased compared to the related art. As such, a heat transfer area between the sensor element 51 and the hairpin 12 may be increased, the temperature sensing (response) of the sensor element 51 may be improved, and the error in temperature measurement may be reduced.

In addition, according to exemplary embodiments of the present disclosure, the sensor housing 52 may be easily and firmly mounted to the apex 33 of the hairpin 12 through the mounting recess 57 defined by the two mounting ribs 55 and 56. Thus, the assembly and attachment of the motor temperature sensor 50 may be improved, and the error in the mounting position of the motor temperature sensor 50 may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for mounting a motor temperature sensor, the system comprising:
   a hairpin wound stator including a stator core having a plurality of slots, and a plurality of hairpins inserted into the slots of the stator core; and
   a motor temperature sensor including a sensor element and a sensor housing covering the sensor element,
   wherein the sensor housing is detachably fitted into one of the plurality of hairpins,
   wherein the sensor housing includes two mounting ribs joined to the apex of the hairpin in a surface contact manner, and a support projection spaced apart from the mounting ribs, and
   wherein the support projection supports an apex of another hairpin disposed adjacent to the hairpin to which the mounting ribs are joined.

2. The system according to claim 1, wherein each hairpin includes a crown portion and two leg portions extending from the crown portion,
   the crown portion includes an apex and first and second inclined portions extending obliquely from the apex, and
   the apex is curved so that an axis of the second inclined portion is offset with respect to an axis of the first inclined portion in a radial direction of the stator core.

3. The system according to claim 1, wherein
   each of the mounting ribs is curved in the same shape as that of the apex.

4. The system according to claim 3, wherein the two mounting ribs are spaced apart from each other in a width direction of the sensor housing,
   a mounting recess is defined between the two mounting ribs, and
   the apex of the hairpin is fitted into the mounting recess.

5. The system according to claim 3, wherein each of the mounting ribs has a contact surface directly contacting a respective side of the apex of the hairpin.

6. The system according to claim 3, wherein the sensor element is located above the mounting ribs.

7. The system according to claim 1, wherein the support projection has a support surface contacting the apex of the adjacent hairpin.

8. The system according to claim 3, wherein the sensor housing has two grip recesses, and
   the two grip recesses are located above the mounting ribs.

9. The system according to claim 8, wherein the sensor element is located between the two grip recesses.

* * * * *